United States Patent [19]
Friedman

[11] Patent Number: 5,500,693
[45] Date of Patent: Mar. 19, 1996

[54] ORNAMENTAL ELEMENT MOUNTING MEANS

[76] Inventor: Dean M. Friedman, 203 Long Beach Rd., Island Park, N.Y.

[21] Appl. No.: 327,902

[22] Filed: Oct. 24, 1994

[51] Int. Cl.$^6$ ............................................ G02L 11/02
[52] U.S. Cl. ........................................ 351/52; 351/51
[58] Field of Search ........................ 351/41, 51, 52, 351/111, 112; 24/522, 525, 535, 569

[56] References Cited

U.S. PATENT DOCUMENTS

| | | | |
|---|---|---|---|
| 1,555,388 | 2/1925 | Schumacher . | |
| 2,006,278 | 6/1935 | Pappert | 88/53 |
| 2,442,483 | 6/1948 | Blasi | 41/34 |
| 2,482,195 | 9/1949 | Martin | 88/41 |
| 2,566,236 | 8/1951 | Meddoff | 88/41 |
| 2,633,059 | 3/1953 | Lindblom | 88/41 |
| 2,682,724 | 7/1954 | Pattillo | 41/10 |
| 2,743,543 | 5/1956 | Goddard | 41/10 |
| 2,752,764 | 7/1956 | Lederer | 351/52 |
| 2,778,136 | 1/1957 | Belgard | 351/51 |
| 2,789,381 | 4/1957 | Belgard | 41/34 |
| 2,803,994 | 8/1957 | De Angelis et al. | 88/41 |
| 2,842,028 | 7/1958 | Belgard | 88/41 |
| 2,933,567 | 4/1960 | Mageoch | 24/569 |
| 2,960,787 | 11/1960 | Quinones et al. | 41/34 |
| 4,245,896 | 1/1981 | Kaplan | 351/41 |
| 4,281,213 | 7/1981 | Sciscione | 24/569 |
| 4,823,636 | 4/1989 | Suska | 25/569 |
| 5,033,836 | 7/1991 | Aoyama | 351/52 |

*Primary Examiner*—William L. Sikes
*Assistant Examiner*—James A. Dudek
*Attorney, Agent, or Firm*—Harold James; Robert L. Epstein; James & Franklin

[57] ABSTRACT

Means are provided for removably mounting an ornamental element to the temple piece of an eyeglass frame. In one set of preferred embodiments, a recess which receives the temple piece is defined between the element and a part. One or more machine screws are employed to secure the element on the temple piece. The orientation of the element is determined by a surface which cooperates with the temple piece. In a second set of preferred embodiments, a part with a screw receiving aperture is received in an opening or slot which has a second screw receiving aperture associated with it. A machine screw is received in the aligned apertures to secure the element to the temple piece.

6 Claims, 4 Drawing Sheets

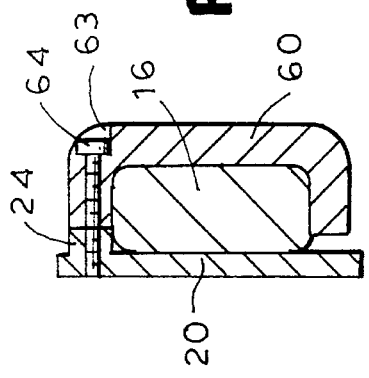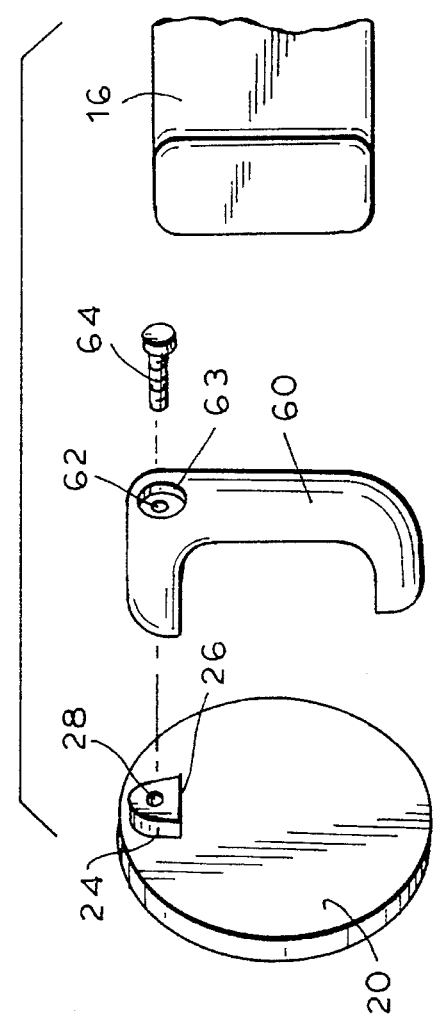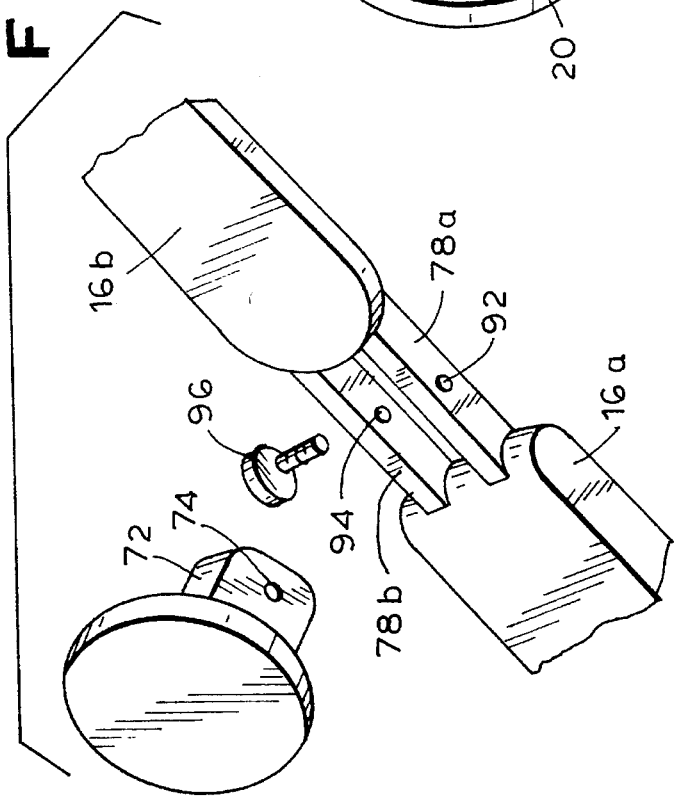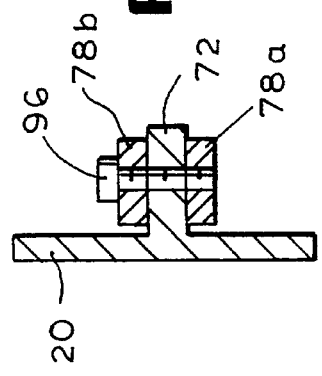

5,500,693

ORNAMENTAL ELEMENT MOUNTING MEANS

This application relates to means for removably mounting an ornamental element to an eyeglass frame and more particularly to a plurality of structures for removably mounting an ornamental element to the temple piece of an eyeglass frame which are simple in design and in manner of use, inexpensive to fabricate and do not substantially reduce the structural strength of the frame.

Individuals who wear eyeglasses often find it desirable to decorate them with various ornamental designs. For example, rock group insignias, company logos, ornaments representing different activities or sports such as fishing or tennis, indicia indicating membership in or sponsorship of faternial, political or religious organizations or other visually pleasing decorations have been displayed in this manner.

It is obviously possible to permanently affix an element carrying such an ornamental design to the lens or the frame of eyeglasses, as part of the manufacturing process. However, it is more desireable to fabricate the ornamental element such that it can be mounted by the retailer after selection of the design of interst by the customer, at the time of purchase or to sell the eyeglasses along with one or more ornamental elements which may be removably mounted to the eyeglasses and thus interchanged as desired, by the purchaser, after purchase.

There are a variety of known methods for securing an ornamental element to eyeglasses, some of which permit removal and interchange of elements. However, these methods generally require that the lenses be specially fabricated or that the frames be formed in a manner which results in a substantial reduction in strength. In particular, while it is considered most desireable to have the element mounted to the temple piece of the frame, the temple piece is often subjected to considerable stress. Alteration of the temple piece which results in a reduction of strength of the temple piece makes it very vunerable to breakage.

In the past, it has been suggested that ornamental elements could be affixed directly to the lenses, such as in U.S. Pat. No. 2,006,278 issued Jun. 25, 1935 to E. Pappert and U.S. Pat. No. 4,245,896, issued Jun. 20, 1981 to Michael Kaplan. However, this requires clamping the lens or forming a hole in the lens, both of which are obviously undesirable.

The prior art also contains teachings as to various methods of affixing elements to the frame members, such as U.S. Pat. No. 2,482,195 issued Sep. 20, 1949 to T. Martin, U.S. Pat. No. 2,682,724 issued Jul. 6, 1954 to M. E. Pattillo, U.S. Pat. No. 2,442,483 issued Jun. 1, 1948 to F. A. Blasi, U.S. Pat. No. 2,842,028 issued Jul. 8, 1958 to A. B. Belgard, U.S. Pat. No. 2,803,994 issued Aug. 27, 1957 to A. De Anglis et al., U.S. Pat. No. 2,743,543 issued May 1, 1956 to R. M. Goddard, U.S. Pat. No. 2,789,381 issued Apr. 23, 1957 to A. B. Belgard, U.S. Pat. No. 2,633,059 to F. W. Lindblom, U.S. Pat. No. 2,778,136 issued Jan. 22, 1957 to A. B. Belgard, U.S. Pat. No. 2,960,787 issued Nov. 22, 1960 to L. Quinones, et al., U.S. Pat. No. 2,566,236 issued Apr. 21, 1958 to S. Meddoff and U.S. Pat. No. 7,555,388 issued Sep. 29, 1925 to E. L. Schumacker. In some cases, these patents teach ways of affixing elements to temple pieces. However, in each case, either the element is not removeable at all or at least not easily removeable by the user or the strength of the temple piece is weakened substantially.

These disadvantages are overcome by my invention which permits easy mounting and removal of an ornamental element on the temple piece by the user, without reducing the strength of the temple piece. In the versions of the first preferred embodiment of my invention, no alternation to the standard temple piece is required at all and hence there is no reduction of strength. The second preferred embodiment of my invention is directed toward frames with plastic temple pieces and metal reinforcing ribs. These frames require only slight modification and there is no loss of strength.

In accordance with one aspect of the present invention, apparatus for removably mounting an ornamental element to the temple piece of an eyeglass frame is provided. The apparatus comprises means which cooperate with the element to define a recess into which the temple piece is received. Screw means are provided for securing the element. The cooperating means may include a surface adapted to abut the temple piece. That surface acts to determine the orientation of the element.

The cooperating means may include a first part which is affixed to the element. The first part has a screw means receiving aperture therein. The cooperating means may also include a second part having a screw means receiving aperture therein. The aperture in the first part alignes with the aperture in the second part. The second part may be permanently affixed to the temple piece. The screw means secures the first part to the second part. Instead, the cooperating means may be a "U" shaped clamp or the "C" shaped clamp which is secured by screws.

The cooperating means may include a second part which extends from the element itself. In this form, the second part may include first and second spaced "L" shaped legs and the screw means may bear directly on the temple piece. The screw means comprises a machine screw of the type having a head with a wrench receiving recess.

In one form, the temple piece has a given thickness and first and second surfaces. The apparatus comprises a first part affixed to the element, having an orientation defining surface and an internally threaded recess. A second part is affixed to the temple piece along the first temple piece surface. It has an aperture. The first part is adapted to abut the temple piece with the orientation defining surface proximate to and cooperating with the second temple piece surface. The recess in the first part alignes with the aperture in the second part. Threaded screw means are adapted to extend through the aperture in the second part and to be received within the aperture in the first part so as to secure the first part to the second part in a relative orientation determined by the orientation defining surface and the second temple surface.

In a second form, the apparatus includes first and second spaced "L" shaped parts extending from the element and defining, with the element, a recess into which the temple piece is removably received. An internally threaded aperture is provided in the element. Screw means are adapted to be received in and extend through the aperture. The screw means are adapted to engage the temple piece so as to press the temple piece against the "L" shaped parts to frictionally secure the element.

In a third form, the apparatus comprises a generally "U" shaped part having first and second ends and defining, with the element, a recess into which the temple piece is adapted to be received. First and second internally threaded apertures are provided in the first and second ends of the "U" shaped part, respectively. First a second apertures in the element, align with the first and second recesses in the "U" shaped part. First and second screws extend through the first and second apertures in the element, respectively and are received in the first and second apertures in the "U" shaped part, so as to clamp the temple piece.

In a fourth form, the apparatus includes a first part affixed to the element and having an internally threaded aperture. A generally "C" shaped part is adapted to define, with the element, a recess into which the temple piece is received. The "C" shaped part has portion with an end. That portion has an aperture. A screw is provided which is adapted to extend through the aperture in the portion of the "C" shaped part and to secure the "C" shaped part to the element with the end of the "C" shaped part adjacent the first part.

In accordance with a second aspect of the invention, apparatus is provided for removably mounting an ornamental element to the temple piece of an eyeglass frame. The apparatus comprises a first part with a screw means receiving aperture. Means are provided to define an opening into which the first part is adapted to be received. A screw means receiving aperture is associated with the opening defining means, proximate the opening. The screw means receiving apertures align when the part is received within the opening. Screw means are adapted to be received within the aligned apertures.

The first part may extend from the element and take the form of a lobe. The opening defining means may include part of the temple piece which has a slot defined therein. The temple piece may include first and second portions. In one case, the opening defining means comprises a pair of spaced ribs connecting the first and second portions of the temple piece. The first part may alternatively be a lobe extending from the temple piece, adjacent the opening and have a screw receiving aperture therein. In another case, the first part may be a single rib which connects the first and second temple piece portions and the first part may include first and second spaced lobes extending from the element, between which the rib is received.

In another version, the temple piece has an opening in the form of a slot. A first part extends from the element and is adapted to be received within the slot. A second part extends from the temple, adjacent to the slot. The first part and the second part each having an aperture. The apertures align when the first part is received in the slot. One of the apertures is internally threaded. Screw means are adapted to be received in the aligned apertures.

In another version, the temple piece is of the type having a portion with an aperture. The apparatus includes a part extending from the element and having an aperture, and a screw. The part is adapted to be received adjacent the temple piece portion, with the apertures aligned. The screw is adapted to be received in the aligned apertures.

The part extending from the element may include first and second spaced lobes adapted to receive the temple piece portion therebetween. Alternately, the portion may include first and second spaced lobes adapted to receive the part therebetween.

The screw means comprises a machine screw. The screw has a head with a wrench receiving recess.

To these and to such other objects to which the invention pertains, the present invention relates to an ornamental element mounting means, as described in detail in the following specification and recited in the annexed claims, taken together with the accompanying drawings, in which like numerals relate to like parts, and in which:

FIG. 12 is an isometric view of a second form of the second preferred embodiment;

FIG. 13 is a cross sectional view of the form shown in FIG. 12;

FIG. 14 is an exploded isometric view of third form of the form preferred embodiment; and FIG. 15 is a cross sectional view of the version shown in FIG. 14.

Figure 1:
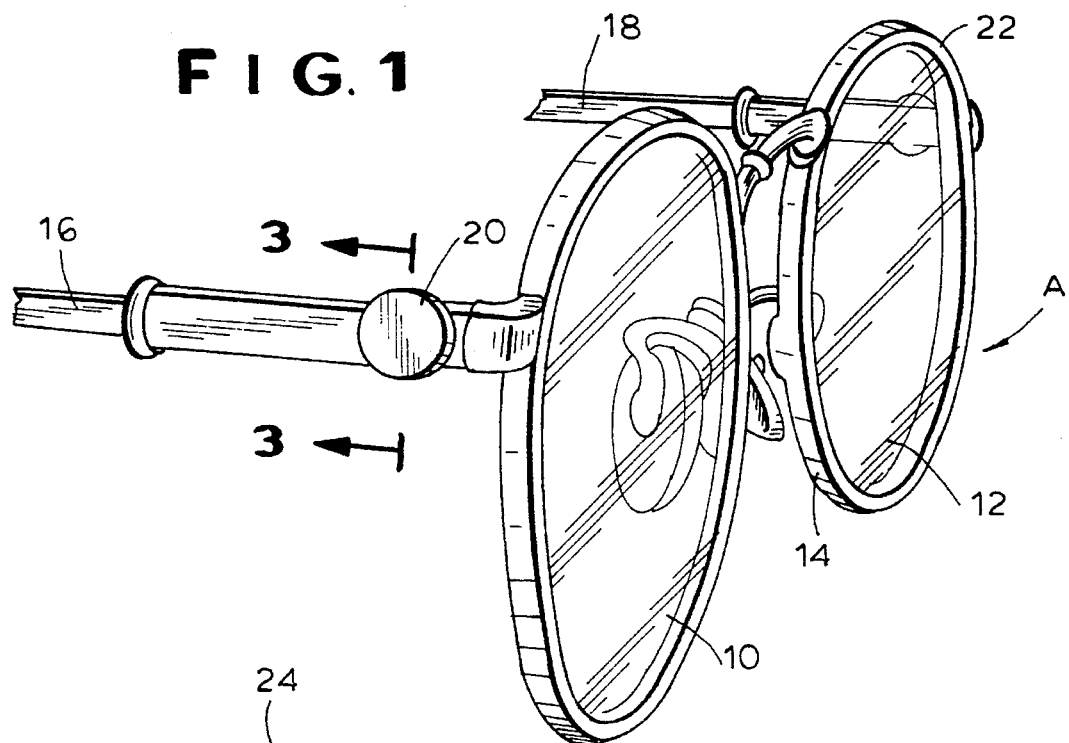
FIG. 1 is an isometric view of a typical eyeglass frame, showing an ornamental element mounted on the temple piece.

FIG. 1 shows a portion of a typical conventioned eyeglass frame, generally designated A, including lenses 10, 12 held in place by a front frame piece 14. Hingeably attached at either end of front frame piece 14 are temple pieces 16, 18. Ornamental elements 20, 22 are shown as mounted on temple pieces 16, 18 respectively. Ornamental elements 20, 22 are illustrated as round but can be of any shape and suitable size. Each element can carry any symbol, indicia, sign, logo or the like on its exterior surface. The elements may be mounted on either temple piece or on both. The mounting means disclosed herein can be used with any type of element and can be used on either temple piece. Thus, while each form of the invention is illustrated only once, it should be understood that the identical structure can be used on both temple pieces, if desired.

The first preferred embodiment of my invention is illustrated in its various forms in FIGS. 2 through 7, 14 and 15. In this preferred embodiment, the temple piece of eyeglass frame need not be altered in any manner such as by forming a hole, slot or recess which would tend to weaken it. Moreover, the forms of this preferred embodiment work equally well with temple pieces of any composition.

Figure 3:
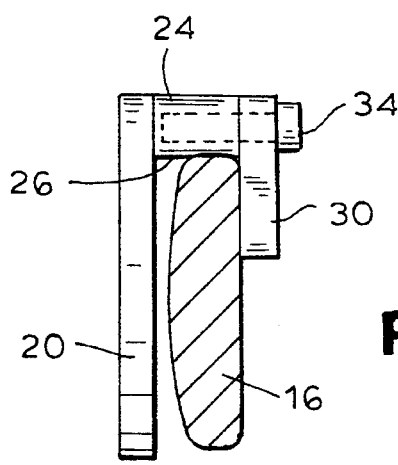
FIG. 3 is a cross sectional view of the form shown in FIG. 2.
Figure 2:
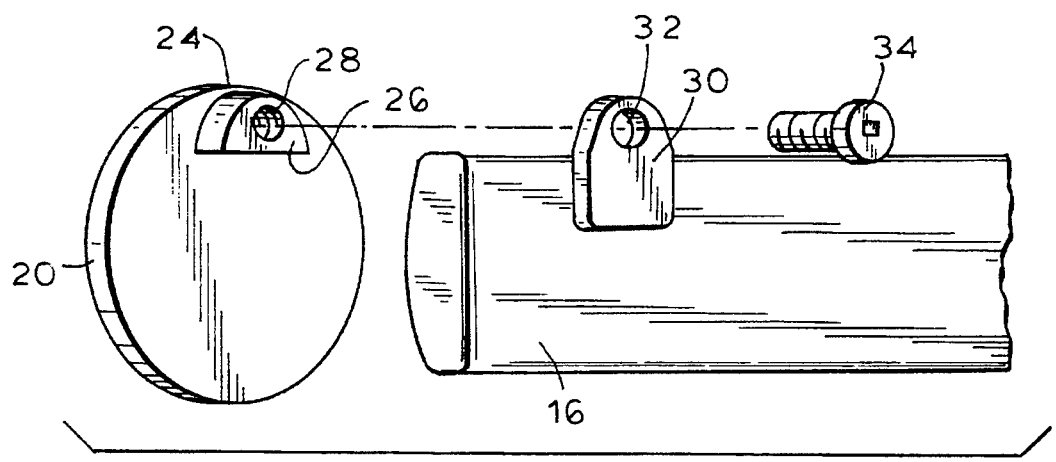
FIG. 2 is an exploded isometric view of a first form of a first preferred embodiment of my invention.

FIGS. 2 and 3 illustrate a first form of the first preferred embodiment which includes an ornamental element 20, illustrated as a disk, having a semicircular first part 24 permanently affixed to the rear surface thereof. Part 24 has a depth greater than the depth of the temple piece 16 and a surface 26 which is situated to abut the top surface of temple piece 16 so as to cooperate with the temple piece to determine and maintain the element in the desired orientation relative to the temple piece. An internally threaded aperture 28 is provided in part 24.

Permanently affixed to the inside surface of temple piece 16, but extending above the plane of the top surface thereof, is a second part 30. Part 30 has a semicircular top portion with an aperture 32 therein aperture 32 has a diameter slightly larger than that of aperture 28 so as to freely receive an externally threaded machine screw 34 therein. The threads of aperture 28 are fashioned to engaged the threads of screw 34. When apertures 28 and 32 are aligned, screw 34 is received in the aperture, it extends through aperture 30 and engages the threads of aperture 28 such that it secures element 20 to temple piece 16, as illustrated in FIG. 3.

A second and third forms of my invention, illustrated in FIGS. 4, 5 and 6, 7 used with an unaltered conventional temple piece. No permanently affixed parts are required. Each may be situated proximate the hinge, if desired.

Figure 5:
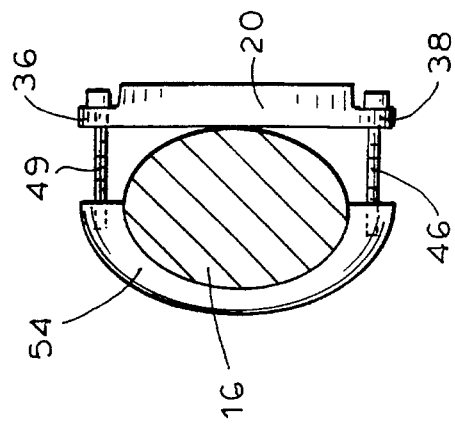
FIG. 5 is a cross sectional view of the form shown in FIG. 4.
Figure 4:
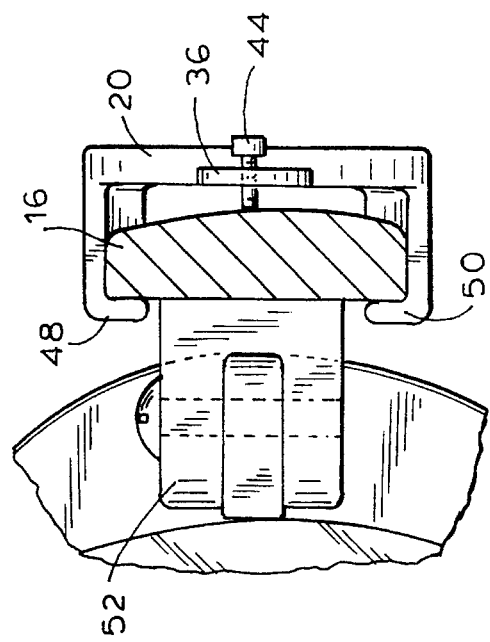
FIG. 4 is an exploded isometric view of a second form of the first preferred embodiment.

In the forms illustrated in FIGS. 4 and 5, element 20 is provided with a first part in the form of outwardly extending wings 36, 38 at opposite ends. Each wing 36, 38 has an aperture 40, 42 which is internally threaded to accept a set screw 44, 46, respectively.

Extending from the rearwardly from the top and bottom of the element are a pair of spaced substantially "L" shaped parts 48, 50 which with the body of the element, define a recess into which the temple piece 16 can be received. The element 20 can be moved along the temple piece until it is adjacent the hing barrel 52, if desired. The tips of parts 48 and 50 are spaced apart a distance which is great enough to permit the hinge to be situated therebetween. Turning set screws 44, 46 presses the temple piece against the shorter inwardly extending portions of the parts 48, 50 so as to frictionally clamp element 20 firmly on the temple piece. The longer parallel portions of parts 48, 50 have surfaces which cooperate with the top and bottom surfaces of the temple piece to orient the element.

Figure 7:
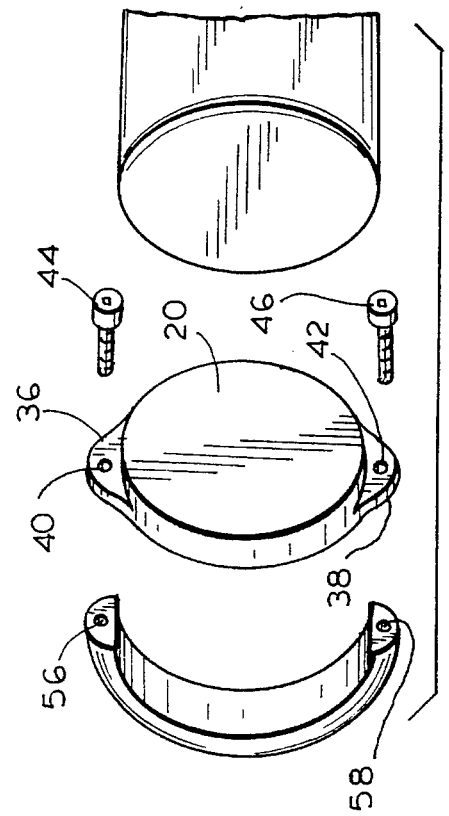
FIG. 7 is a cross sectional view of the form shown in FIG. 6.
Figure 6:
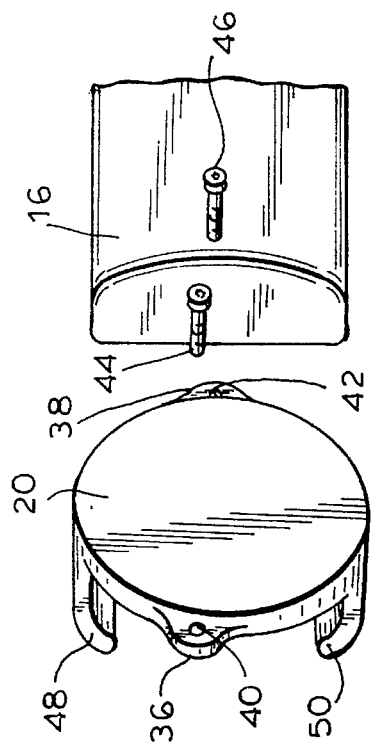
FIG. 6 is an exploded isometric view of a third form of the first preferred embodiment.

FIGS. 6 and 7 show another form which utilizes an element 20, with wings 36, 38 and apertures 40, 42 which receive machine screws 44, 46. However, in this form, the apertures 42, 44 are not internally threaded and are larger in diameter so as to freely receive the screws 44, 46.

A "U" shaped clamp 54 cooperates with element 20 so as to form a recess within which the temple piece 16 is frictionally received. Internally threaded apertures 56, 58 in clamp 54 align with apertures 40, 42 and receive screws 40, 42 respectively. Clamp 54 is shown with an internal surface which is arcuate to match the curved rear surface of the temple piece. Obviously, this surface can be fashioned to fit any surface configuration from flat to semicircular. The internal surface cooperates with the temple piece to orient the element.

FIGS. 14 and 15 illustrate another form of the first preferred embodiment. This form is similar to that shown in FIGS. 2 and 3 in that element 20 has a first part 24 with an orienting surface 26 and an internally threaded aperture 28. It is similar to the form of FIGS. 6 and 7 in that it ultilizes a clamping part, in this form a substantially "C" shaped clamp 60. Clamp 60 has an aperture 62 for freely receiving a machine screw 64. Aperture 62 is provided with a countersink opening 63 such that the surface of the head of machine screw 64 is recessed with respect to the surface of the clamp. Like the first form, surface 26 cooperates with the top surface of the temple piece to orient the element.

The second preferred embodiment of my invention is illustrated in FIGS. 8 through 13. The three versions illustrated all require an opening or slot be formed in the temple piece. However, this is done without substantially weakening the piece.

Figure 9:
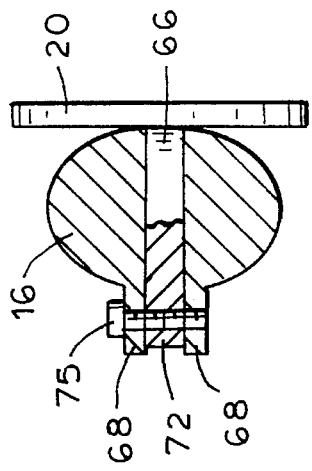
FIG. 9 is a cross sectional view of the form shown in FIG. 8.
Figure 8:
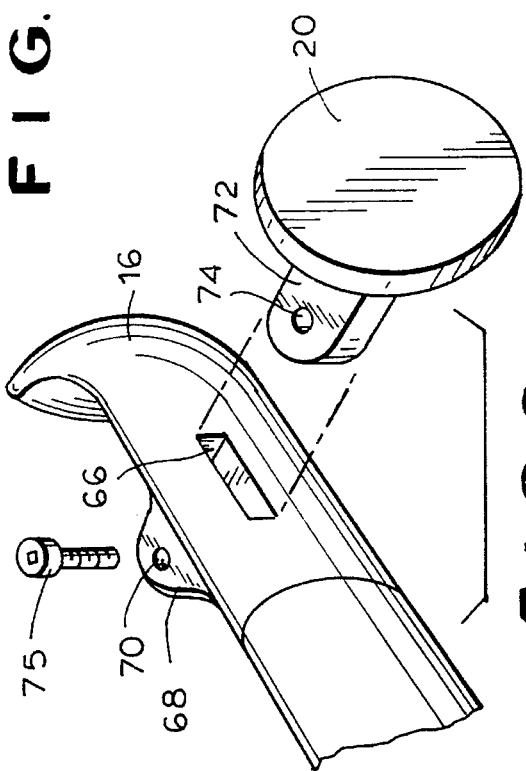
FIG. 8 is an exploded isometric view of a fourth form of the first preferred embodiment.

In the version illustrated in FIGS. 8 and 9, a rectangular slot 66 is formed through the temple piece. A pair of spaced lobes 68, with apertures 70 are affixed to the inner surface of temple piece 16 on top and bottom of the slot 66. Element 20 is provided with a lobe 72 extending from the rear surface. Lobe 72 has an internally threaded aperture 74.

Lobe 72 is inserted through slot 66 until aperture 74 aligns with apertures 70. A machine screw 75 secures the element by engaging the threads in aperture 74.

The versions shown in FIGS. 10 and 11 and FIGS. 12 and 13 respectively are especially designed for use with temple pieces which have plastic bodies and metal reinforcing ribs. In each case, the plastic body is formed into two spaced parts, 16a and 16b exposing a portion of either a single rib 76 (FIGS. 10, 11) or spaced double ribs 78a, 78b (FIGS. 12, 13).

Figure 10:
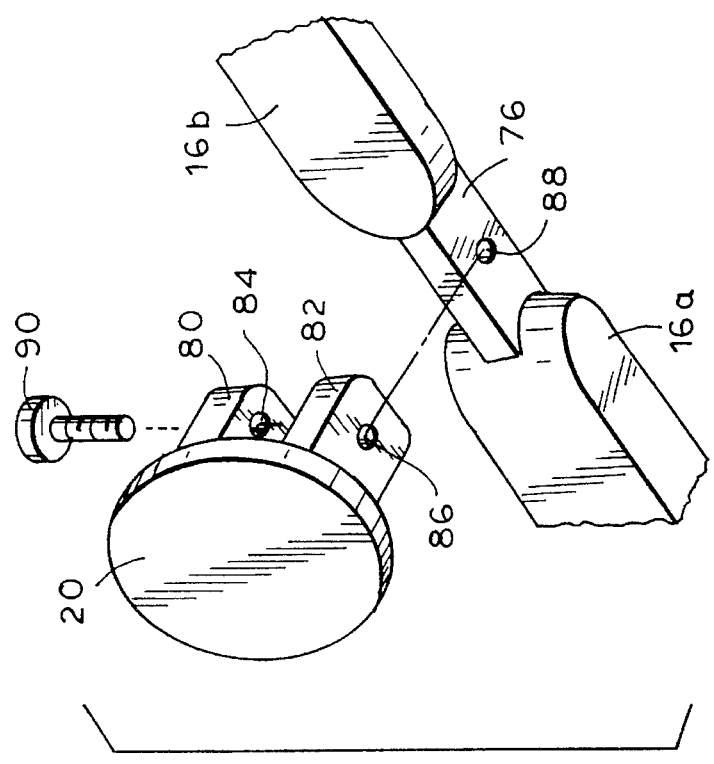
FIG. 10 is an exploded isometric view of a first form of a second preferred embodiment of my invention.
Figure 11:
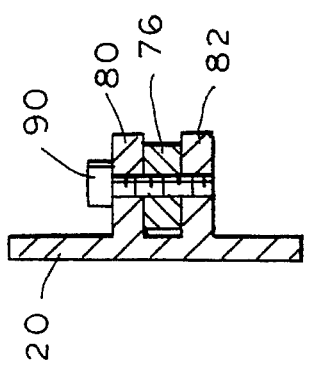
FIG. 11 is an exploded cross sectional view of the form of FIG. 10.

In the version of FIG. 10 and 11, element 20 has a pair of spaced rearwardly extending lobes 80, 82 with apertures 84, 86, respectively. Aperture 86 is internally threaded. Rib 76 is provided with an aperture 88. Apertures 84 and 88 are not threaded. A machine screw 90 is inserted into the aligned apertures 84, 86, 88 to secure the element by engaging the threads in aperture 86.

The version of FIGS. 12 and 13 includes an element 20 with a lobe 72 and aperture 74 essentially as shown in FIG. 10 but in this case the aperture is not threaded. Lobe 72 is received between ribs 78a, 78b which contain apertures 92, 94. Only aperture 92 is threaded. A machine screw 96 is received within the aligned apertures to secure the element.

In each form of the invention, I employ a machine screw of the type having a head with a recess adapted to receive an Allen wrench or the like. This provides for a more positive connection with the wrench and at the same time eliminates any edges on the screw head which might scratch the user.

It will now be appreciated that the present invention relates to an ornamental element mounting means designed for use on the temple piece of eyeglass frames. The forms of the first preferred embodiment can be used with conventional eyeglass frames without modification of the temple piece other than the addition of parts which do not in any way reduce the strength of the frame. Each form includes a surface with cooperates with the temple piece surface to determine and maintain the element in the desired orientation. In the second preferred embodiment, a relatively simple and inexpensive modification to the conventional temple piece is required but this modification does not substantially reduce the strength of the piece. Machine screws with wrench receiving openings are used throughout for more positive engagement with the tightening wrench and to avoid edges which might scratch or catch.

While only a limited number of forms of the present invention have been disclosed herein for purposes of illustration, it is obvious that many variations and modifications could be made thereto. It is intended to cover all of these variations and modifications which fall within the scope of the present invention, as defined by the following claims:

I claim:

1. Apparatus for removably mounting an ornamental element on the exterior surface of a temple piece of an eyeglass frame, the apparatus comprising a first part to which the ornamental element is fixed, said first part having an internally threaded aperture and a surface adapted to abut the temple piece to orient the ornamental element relative to said temple piece, a second part fixed to and having a portion extending beyond the interior surface of the temple piece, a non-threaded aperture in said extending portion of said second part and an externally threaded screw, said screw being adapted to extend through said aperture in said second part and engage said internally threaded aperture in said first part to removably secure the ornamental element.

2. The apparatus of claim 1 wherein said first part surface comprises a planar surface.

3. The apparatus of claim 1 wherein said first part further comprises an arcuate surface.

4. The apparatus of claim 3 wherein said extending portion of said second part comprises an arcuate surface.

5. The apparatus of claim 4 wherein said arcuate surface of said first part aligns with said arcuate surface of said extending portion of said second part.

6. The apparatus of claim 5 wherein said screw comprises a machine screw with a head with a polygon shaped recess.

* * * * *